United States Patent [19]

Numasaki

[11] Patent Number: 5,001,582
[45] Date of Patent: Mar. 19, 1991

[54] APPARATUS FOR AUTOMATICALLY CHANGING AN INFORMATION STORAGE MEDIUM

[75] Inventor: Takamoto Numasaki, Kanagawa, Japan

[73] Assignee: Kabushiki Kaisha Toshiba, Kanagawa, Japan

[21] Appl. No.: 292,866

[22] Filed: Jan. 3, 1989

[30] Foreign Application Priority Data

Jan. 13, 1988 [JP] Japan .................................. 63-005101

[51] Int. Cl.$^5$ .............................................. G11B 15/68
[52] U.S. Cl. ................................... 360/98.06; 360/92; 269/34; 269/36
[58] Field of Search ................. 360/92, 98.06; 369/34, 369/36

[56] References Cited

U.S. PATENT DOCUMENTS

| | | | |
|---|---|---|---|
| 4,504,936 | 3/1985 | Faber et al. ........................... | 369/34 |
| 4,742,405 | 5/1988 | Teranishi .............................. | 360/92 |
| 4,742,504 | 5/1988 | Takasuka et al. ..................... | 369/36 |
| 4,779,151 | 10/1988 | Lind et al. ............................ | 360/92 |
| 4,912,575 | 3/1990 | Shiosaki ............................... | 360/92 |

Primary Examiner—Robert S. Tupper
Attorney, Agent, or Firm—Finnegan, Henderson, Farabow, Garrett, and Dunner

[57] ABSTRACT

An apparatus for automatically changing an information storage medium includes a main body, a storage section having a plurality of storage portions in the main body for storing a plurality of information storage media therein, an information processing unit having an inlet port in the main body for processing information stored in the medium inserted therein through the inlet port, and transfer device for transferring the medium between the storage section and the information processing unit and for automatically inserting the medium into the storage section and the information processing unit. The transfer device includes a base member, a carrier frame rotatably mounted on the base member for holding the information storage medium, a drive mechanism for rotating the carrier frame with respect to the base member, and a positioning device for forcibly positioning the carrier frame in alignment with respect to one of the plurality of storage portions of the storage section or the inlet port of the information processing unit after the rotation of the carrier frame by the drive mechanism.

10 Claims, 19 Drawing Sheets

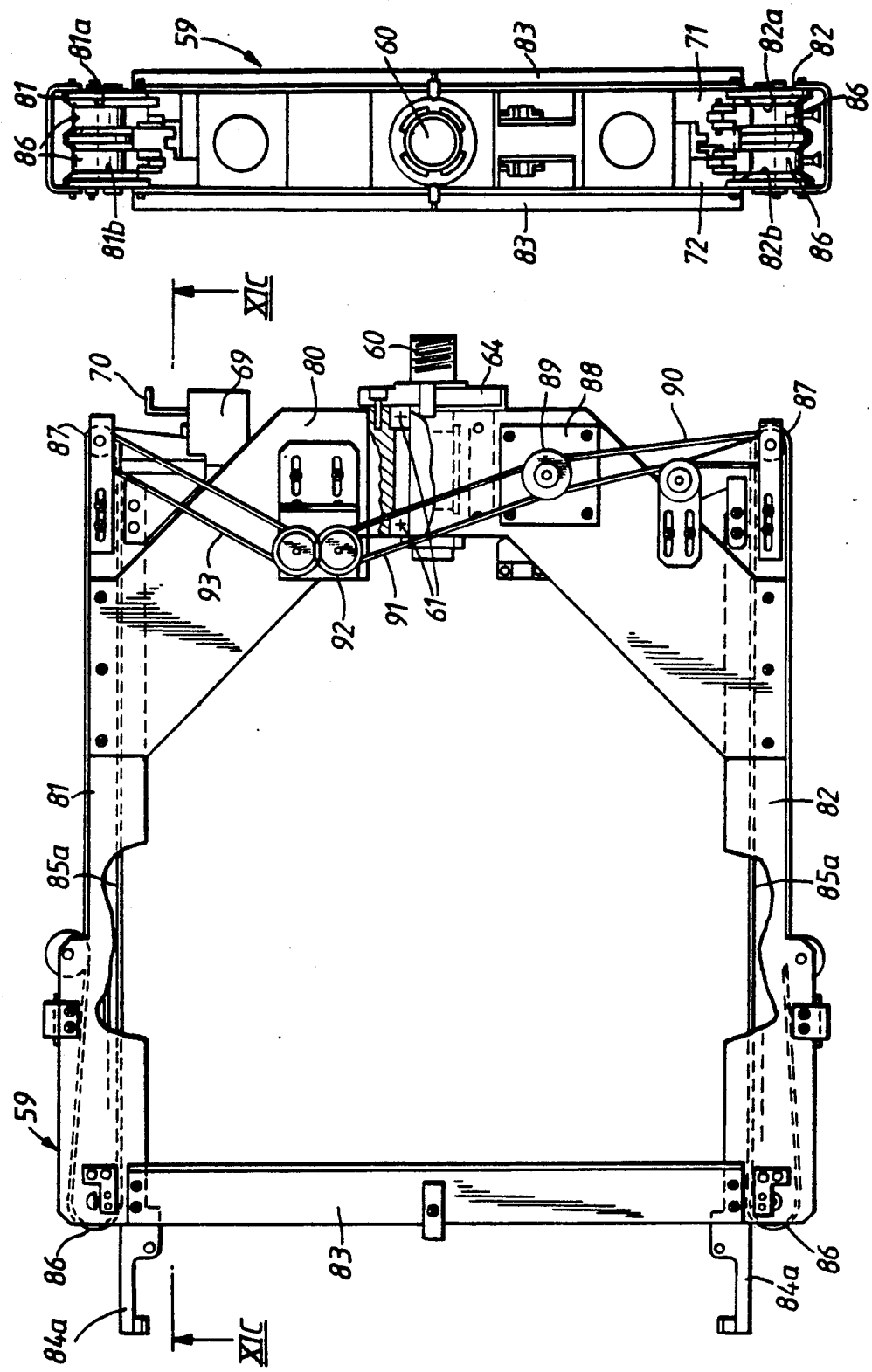

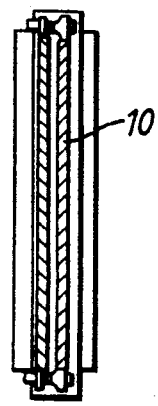
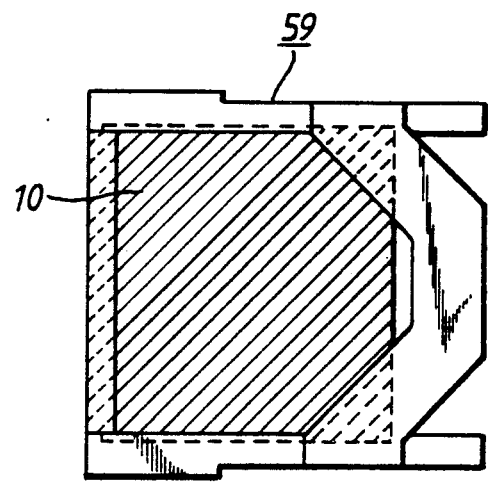
Fig.14A.    Fig.14B.
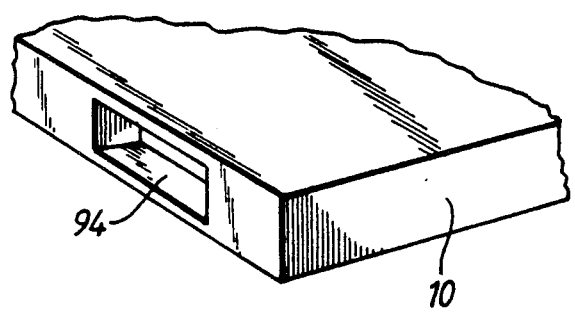
Fig.15.

APPARATUS FOR AUTOMATICALLY CHANGING AN INFORMATION STORAGE MEDIUM

BACKGROUND OF THE INVENTION

1. Field of the Invention

The present invention relates to an apparatus for automatically changing an information storage medium which automatically effects loading or ejecting of an information storage medium into or out of an information processing device and automatically changes specified medium.

2. Description of the Related Art

An automatic disk changing apparatus, as fully disclosed in U.S. Pat. No. 4,742,504 (Takasuka et al.) employs a pair of cassette storage racks for storing a plurality of optical disk cassettes in an upright (vertical) position. A disk cassette manually inserted into the disk changing apparatus is loaded in a transfer device. The transfer device includes a rotatable carrier frame for holding the disk cassette and transferring it either to one of the storage racks or to an optical disk drive unit. To insert the disk cassette into the optical disk drive unit, the carrier frame is rotated through 90 degrees so that the disk cassette is loaded into the optical disk drive unit in approximately a horizontal position. When it is necessary to reverse the side of the disk cassette loaded in the optical disk drive unit with its side A operated, the disk cassette is taken out from the disk drive unit and held in the carrier frame of the transfer device. Then the carrier frame is rotated 180 degrees so that the disk cassette is reversed from side A to side B. After that, the disk cassette is loaded into the disk drive unit from the carrier frame so that side B of the disk cassette will be operated in the disk drive unit.

The carrier frame of the transfer device is operatively connected to a stepping motor via a pulley and a belt, and is tilted or inverted by rotation through 90 or 180 degrees by the action of the stepping motor.

However, in the automatic disk changing apparatus having the above structure, there may be occasions when the carrier frame of the transfer device fails to come accurately to a precise horizontal disposition with respect to the insertion port of the storage rack or the optical disk drive unit because of variations in the stopping position of the rotating shaft of the stepping motor or loosening of the belt. Then, since the stopping position of the carrier frame is maintained by the stepping motor, the stopping position of the carrier frame may be dislocated from the correct position by vibration or other external force.

SUMMARY OF THE INVENTION

It is an object of the present invention to provide an apparatus for automatically changing an information storage medium, in which a carrier frame holding an information storage medium can be accurately aligned with respect to a storage section or an inlet port of an information processing unit without dislocation from the correct position by vibration or other external force.

According to the present invention, the apparatus for automatically changing an information storage medium includes a main body; a storage section having a plurality of storage portions in the main body for storing a plurality of information storage media therein; at least one information processing unit having an inlet port in the main body for processing information stored in the medium inserted therein through the inlet port; and transfer means for transferring the medium between the storage section and the information processing unit and for automatically inserting the medium into the storage section and the information processing unit. The transfer means comprises base member; frame means rotatably mounted on the base means for holding at least one information storage medium; drive means for rotating the frame means with respect to the base member; and positioning means for forcibly positioning the frame means in alignment with respect to one of the plurality of storage portions of the storage section or the inlet port of the information processing unit after the rotation of the frame means by the drive means.

BRIEF DESCRIPTION OF THE DRAWINGS

FIGS. 1 to 21B show an automatic disk cassette changing apparatus according to an embodiment of the present invention, in which:

FIG. 1 is a perspective view showing an internal structure of the apparatus;

FIG. 2 is a perspective view of a disk cassette used in the apparatus of FIG. 1;

FIG. 3 is a rear view of a storage section seen from a transfer mechanism side in the apparatus;

FIG. 4 is a side view of the storage section shown in FIG. 3;

FIG. 5 is a sectional view of the storage section taken along the line V—V in FIG. 4;

FIGS. 6 to 8 are respectively a plan view, a side view, and a front view of a carrying device;

FIG. 9 is a plan view of the carrying device on which a disk cassette is placed;

FIGS. 11A and 11B are respectively a plan view and a rear view showing the detailed arrangement of the carrier frame;

FIG. 12 is a perspective view of a pulley mechanism;

FIG. 13 is a schematic side view of the automatic disk cassette changing apparatus;

FIGS. 14A and 14B are respectively a front view and a plan view showing a state wherein a disk cassette is stored in the transfer frame;

FIG. 15 is an enlarged perspective view showing part of the disk cassette;

FIG. 19 is a front view of the carrier frame positioning mechanism shown in FIGS. 10A and 10B;

FIGS. 21A and 21B are side views for explaining the operation of the positioning mechanism of FIG. 19.

DETAILED DESCRIPTION OF THE PREFERRED EMBODIMENT

Figure 1:
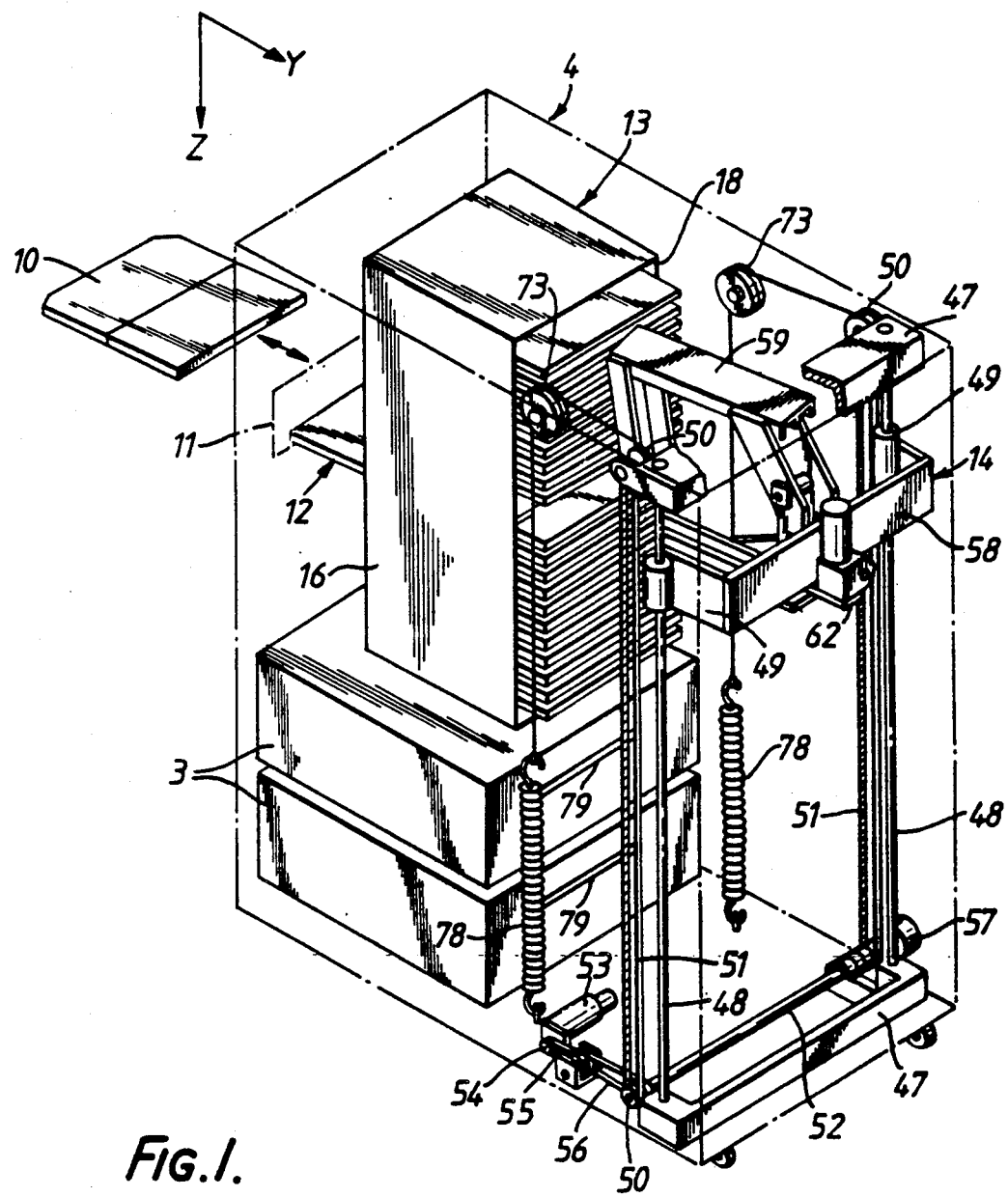
Figure 2:
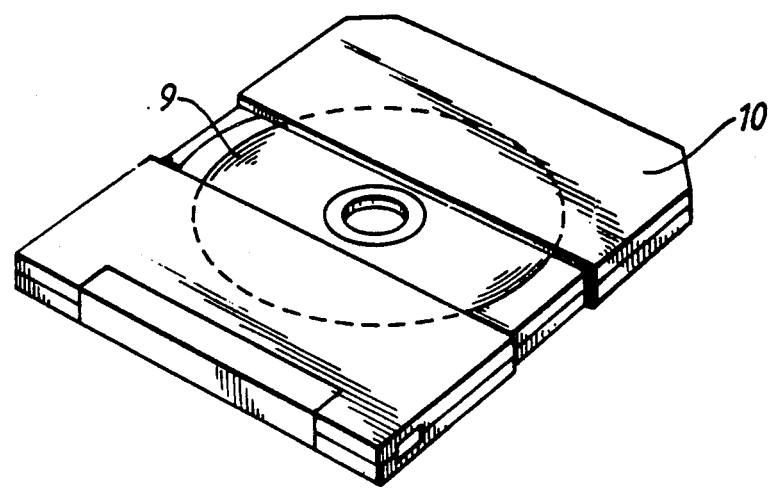

A preferred embodiment of the present invention will now be described with reference to FIGS. 1 to 21B. FIG. 1 shows an automatic disk changing apparatus according to the present invention. The front wall of a box-shaped main body 4 is formed with a slot-shaped input/output port 11 through which a disk cassette 10 is horizontally carried in and out main body 4. As shown in FIG. 2, optical disk 9, which is provided with a two-sided information storage medium capable of recording and reproducing data via a by laser beam, is accommodated in openable disk cassette 10. The automatic disk changing apparatus comprises a loading device 12 for carrying disk cassette 10 through input/output port 11, a storage section 13 for storing a plurality of cassettes 10 carried by loading device 12, two optical disk drive units (image information processing units) 3 for read-/write-accessing disk 9 in disk cassette 10, and transfer device 14 for transferring disk cassette 10 between optical disk drive units 3, loading device 12 and storage section 13. Storage section 13 and optical disk drive units 3 are aligned along a Z direction (i.e, the vertical direction).

Figure 3:
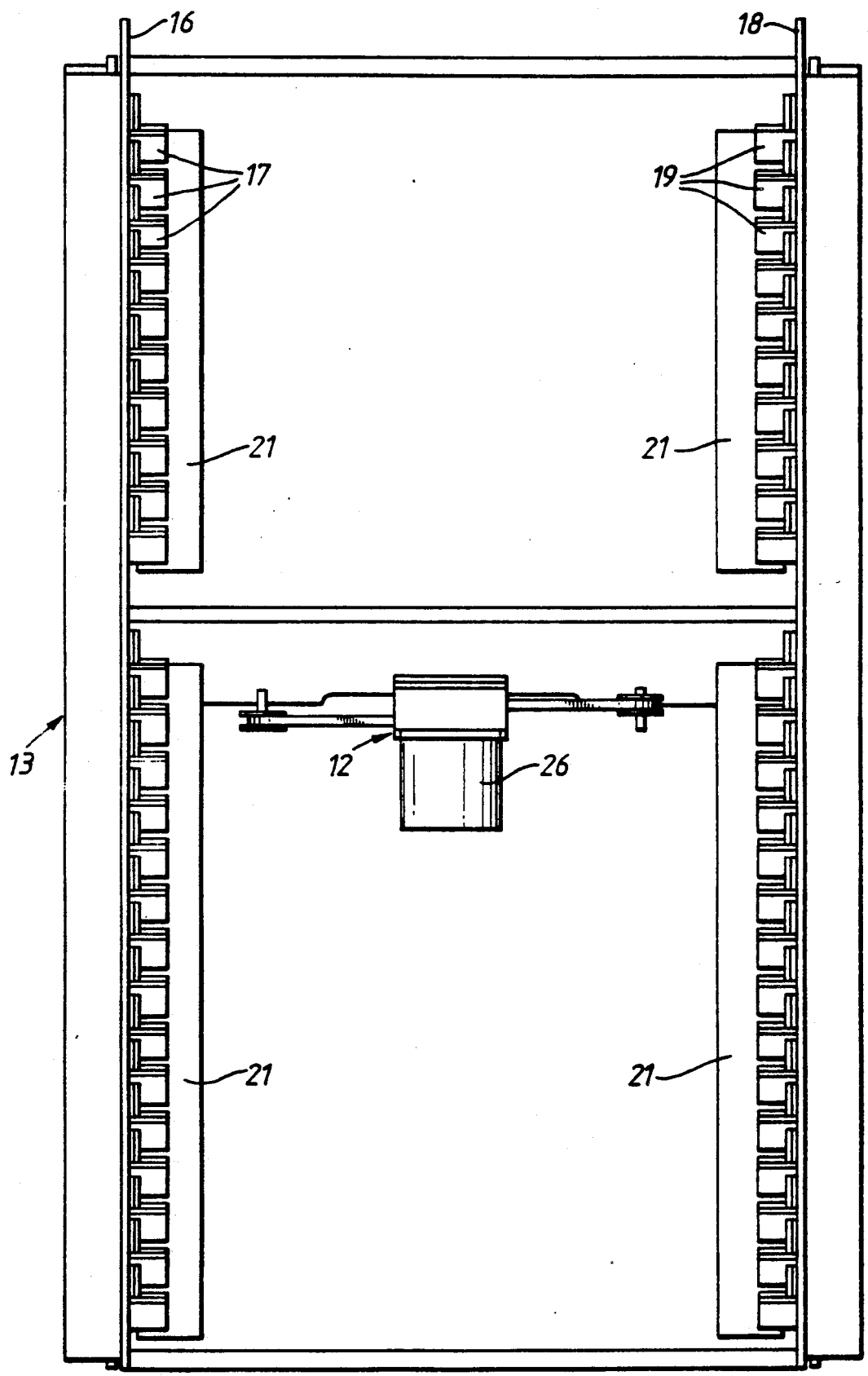
Figure 4:
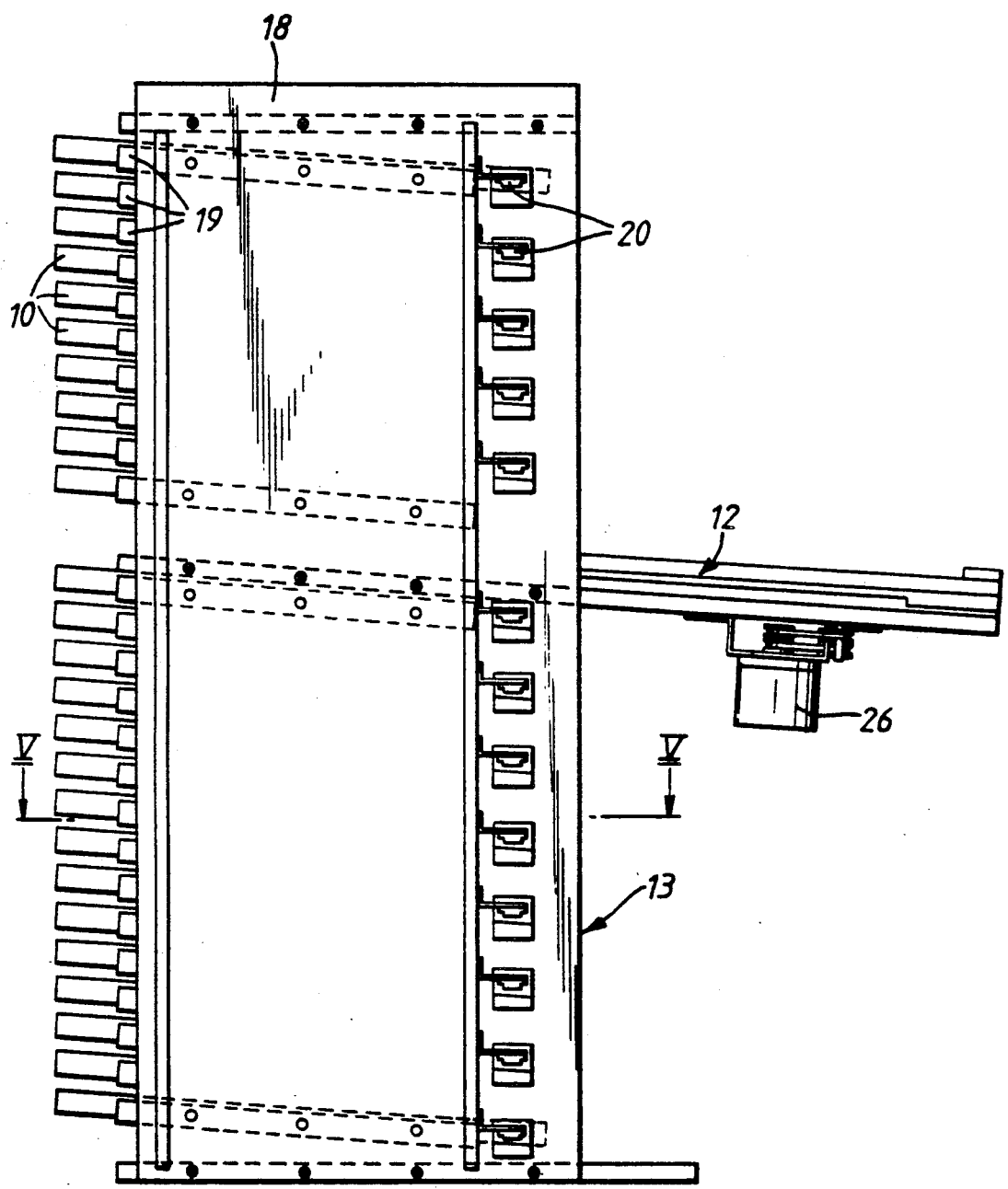
Figure 5:
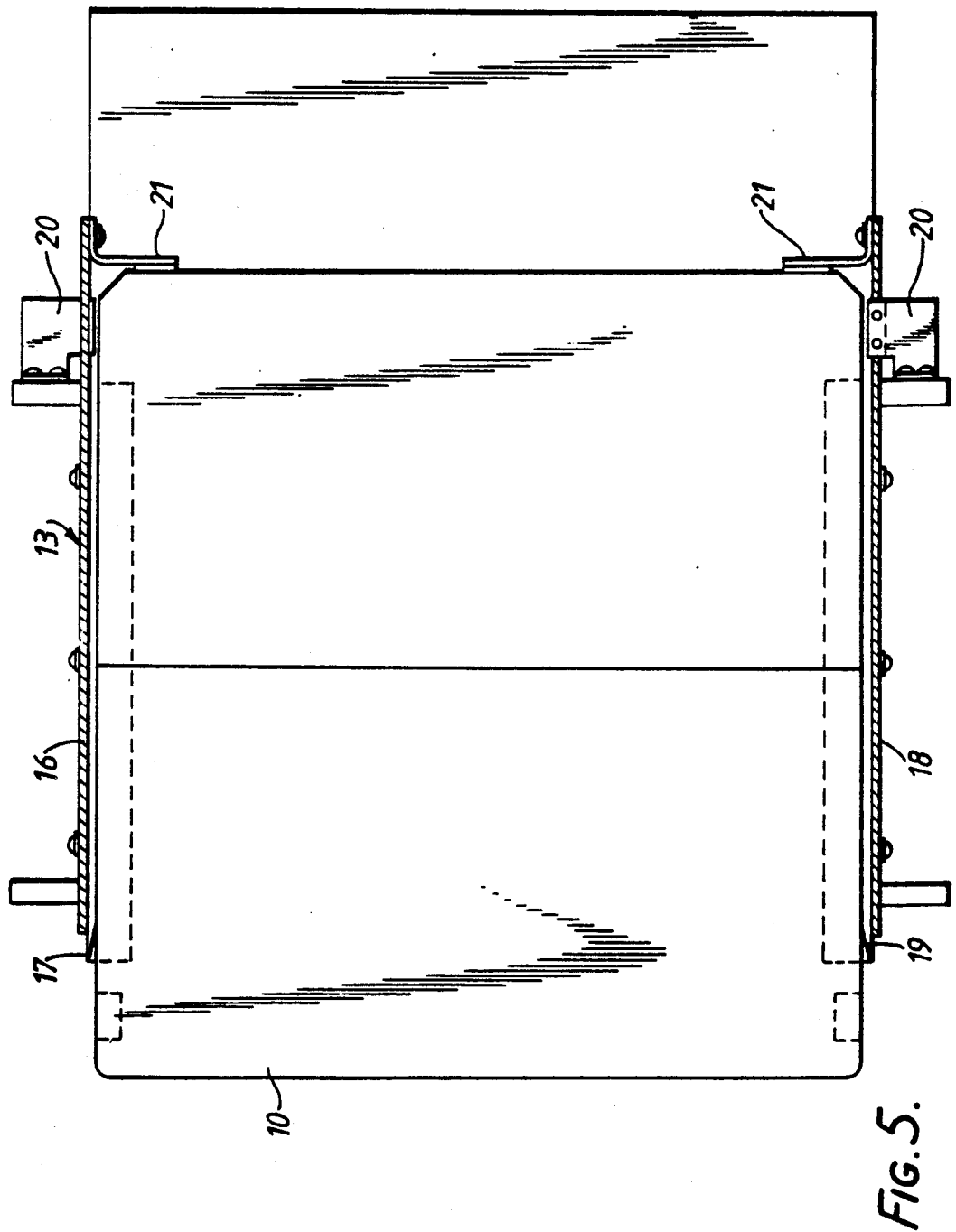
Figure 6:
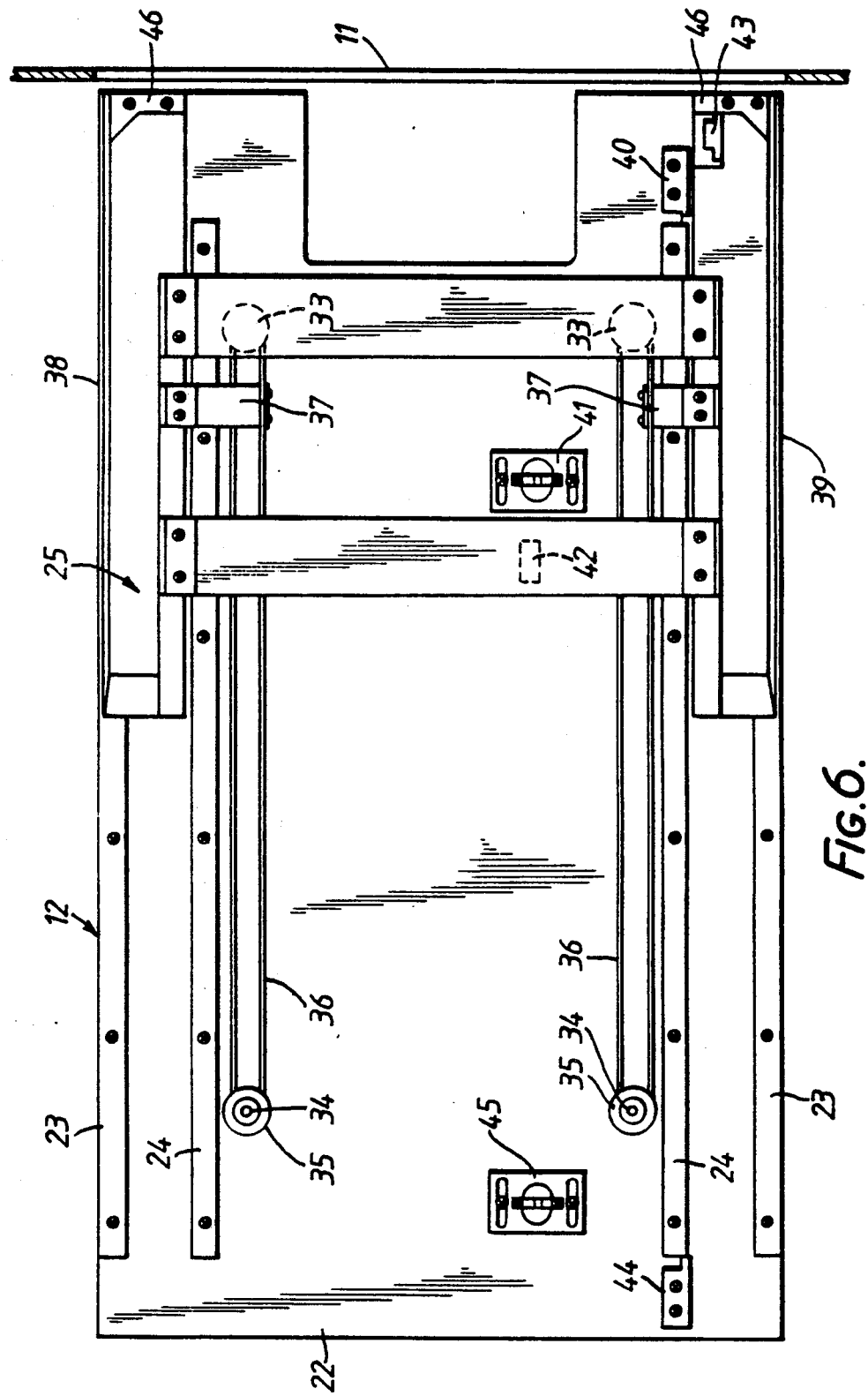
Figure 7:
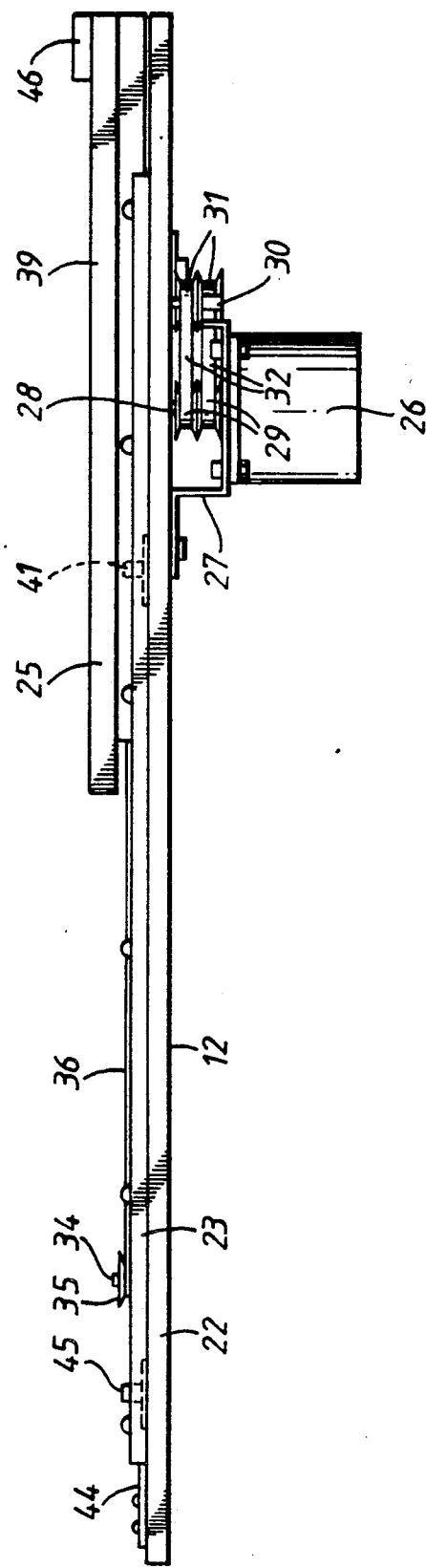
Figure 8:
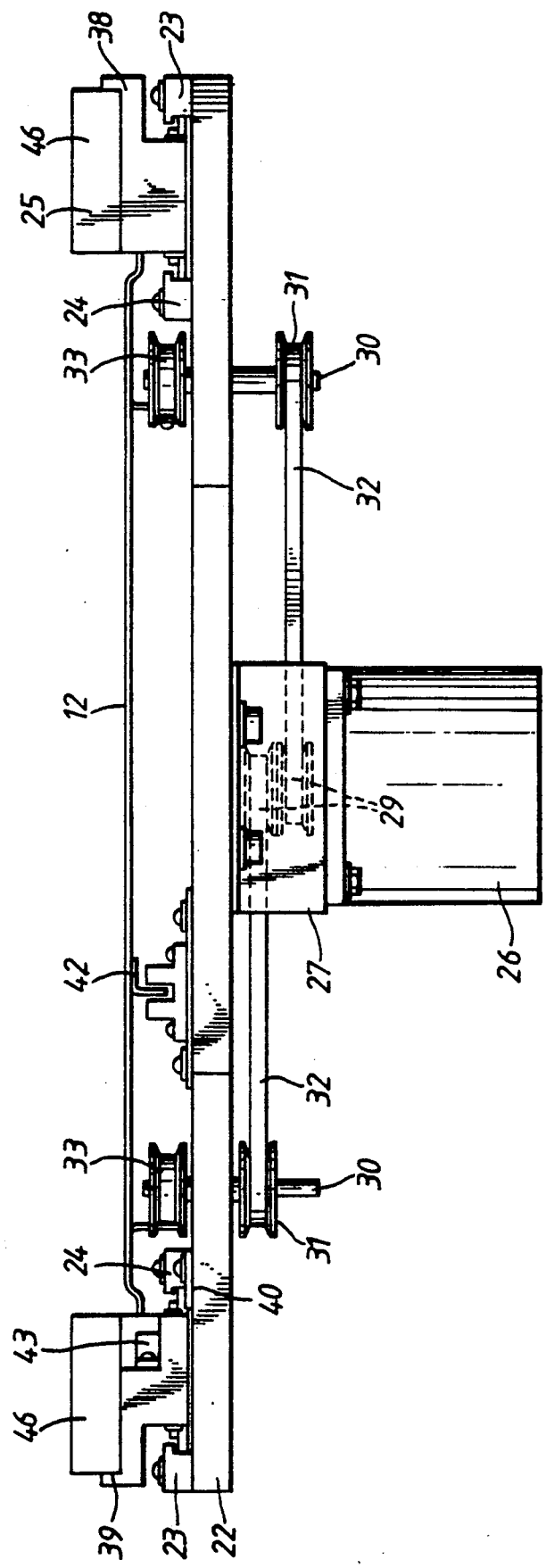

Storage section 13 stores a large number of cassettes 10 such that cassettes 10 are vertically (Z direction) stacked with a predetermined space therebetween while each cassette lies substantially horizontally (in Y direction) and partially extends backward. Disk cassettes 10 can be stored in or removed from the rear side of storage section 13 by transfer device 14. As shown in FIGS. 3 to 5, storage section 13 comprises frames 16 and 18 constituting the right and left side walls. A large number of guides 17 are fixed to frame 16 to guide the right side edge of disk cassette 10. Similarly, a large number of guides 19 are fixed to frame 18 to guide the left side edge of disk cassette 10. A pair of first detectors 20 for detecting the storage of disk cassette 10 are arranged at the distal end portions of the guides 17 and 19 of each stage. Left and right guides 17 and 19 are mounted on left and right frames 16 and 18 such that the front end of disk cassette 10 supported by the guides is slightly inclined downward. A distance between two adjacent guides 17 (or 19) is slightly larger than the thickness of the disk cassette 10 to allow easy insertion of the disk cassette therebetween. Disk cassettes10 stored in storage section 13 are positioned by corresponding stoppers 21 and are free from positional errors caused by vibration or the like.

As shown in FIGS. 1 and 3 to 9, loading device 12 is located at the center of storage section 13. Loading device 12 transfers disk cassette 10 from input/output port 11 to a position wherein the disk cassette lies the same state as those of other disk cassettes 10 already stored in storage section 13 and transfers disk cassette 10 in storage section 13 back to input/output port 11.

Loading device 12 comprises a rectangular base 22 extending from storage section 13 to input/output port 11 along the Y direction. A pair of first guide rails 23 and another pair of second guide rails 24 are fixed by screws on base 22 and are parallel to each other. First guide rails 23 are fixed along the side edges of base 22, and second guide rails 24 are fixed between first guide rails 23. A slider 25 is mounted on base 22 to be slidable along first and second guide rails 23 and 24 in the Y direction (the back-and-forth direction). Slider 25 is driven upon rotation of a stepping motor 26. Motor 26 is mounted on the lower surface of the front end of base 22 by means of a support frame 27. A pair of pulleys 29 are mounted on a rotating shaft 28 of motor 26. A pair of shafts 30 vertically extend through base 22. Pulleys 31 are mounted on shafts 30, respectively, and are located below base 22. Belts 32 are looped between pulleys 31 and pulleys 29, respectively. Pulleys 33 are mounted on shafts 30, respectively, and are located above base 22. A pair of pulleys 35 are rotatably mounted on the upper surface of the rear end portion of base 22 by means of shafts 34. Belts 36 are looped between pulleys 33 and corresponding pulleys 35, respectively, and extend the Y direction. Part of each belt 36 is connected to slider 25 through brackets 37, respectively. When stepping motor 26 is rotated in the forward and reverse direction, slider 25 can reciprocate along the Y direction. Projections 38 and 39 extend along the Y direction on both side edges of slider 25 so as to guide both side surfaces of disk cassette 10.

Figure 9:
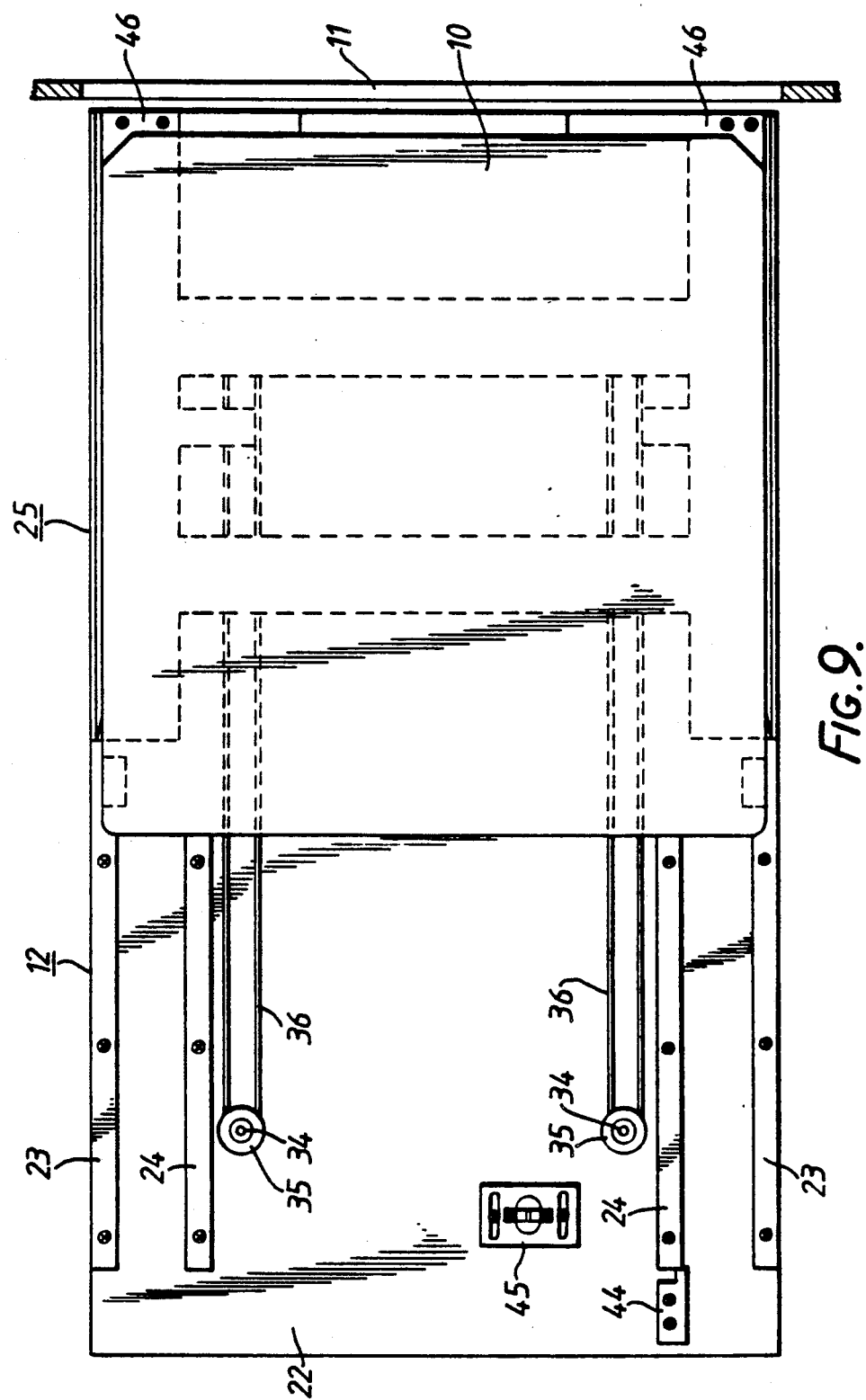

A stopper 40 is fixed by screws on the upper surface of the front end portion of base 22 and is designed to abut against slider 25. The initial position of slider 25 is defined as a position where slider 25 abuts against stopper 40. Whether or not slider 25 is located in the initial position is detected by a second detector 41. More specifically, second detector 41 includes a light source (not shown) fixed on base 22 and a light-receiving element for receiving light from the light source. Detector 41 also has a recess. A light-shielding plate 42 is fixed to the lower surface of slider 25. When slider 25 is located in the initial position, light-shielding plate 42 is inserted in the recess of second detector 41 to shield the light-receiving element from the light source, thereby detecting that slider 25 is located in the initial position. A third detector 43 is arranged on slider 25 to detect whether or not the insertion direction of disk cassette 10 is correct and whether or not disk cassette 10 has been inserted properly. A stopper 44 is fixed by screws on the upper surface of the rear end portion of base 22 and is designed to abut against slider 25. The advanced position of slider 25 is defined as a position where slider 25 abuts against stopper 44. When slider 25 is moved to the advanced position, disk cassette 10 on slider 25 is held in the same state as that of other disk cassettes 10 which have already been stored in storage section 13. Whether or not slider 25 is located in the advanced position is detected by a fourth detector 45. Fourth detector 45 is fixed on base 22 and is constructed the same manner as second detector 41. When light-shielding plate 42 fixed on the lower surface of slider 25 is inserted in the recess of fourth detector 45, light from the light source to the light-receiving element is shielded by plate 42, thereby detecting that slider 25 is located in the advanced position. A pair of guides 46 are mounted on the end of slider 25 at the side of input/output port 11 to align the leading end of disk cassette 10. When third detector 43 detects that disk cassette 10 has been inserted in the correct direction and has been inserted properly, as shown in FIG. 9, the carrying of the disk cassette 10 to the advanced position is possible.

When third detector 43 detects that disk cassette 10 is placed on slider 25 along the correct direction and properly loaded on slider 25, disk cassette 10 can be carried. When stepping motor 26 is rotated in the forward direction, slider 25 which supports disk cassette 10 thereon is moved in a direction toward storage section 13, as shown in FIG. 9. Slider 25 is stopped at a position (i.e., the advanced position) where fourth detector 45 detects light-shielding plate 42. In the advanced position, disk cassette 10 placed on slider 25 is held in the same state as that of other disk cassettes 10 which have already been stored in storage section 13. Since stepping motor 26 is used as a drive source for slider 25, slider 25 can be kept in the advanced position by the self retaining force of the motor. Cassette 10 received in storage section 13 by loading device 12 can be processed in the same manner as other cassettes 10 stored in storage section 13.

Transfer device 14 will be described in detail. As shown in FIG. 1, transfer device 14 comprises a pair of parallel guide shafts 48. Shafts 48 oppose storage section 13 and optical disk drive units 3 and extend along the Z direction. The upper and lower ends of shafts 48 are fixed to a pair of horizontal frames 47, respectively. A pair of carriages 49 are mounted on each guide shaft 48 to be movable along the Z direction. Carriages 49 are connected to each other by arm base 58. Two pairs of rollers 50 are mounted each frame 47 and are located on the upper and lower end sides of corresponding guide shaft 48. Belts 51 are looped between two pairs of rollers 50 along guide shafts 48, respectively. Lower rollers 50 are connected to each other by a shaft 52 and are rotated together. A driving force of a servo motor 53 is transmitted to shaft 52 through a pulley 54, belts 55 and 56, and the like. Parts of belts 51 are coupled to corresponding carriages 49. When servo motor 53 is rotated in the forward direction, carriages 49 are moved by corresponding belts 51 along the Z direction. An absolute encoder 57 is mounted at one end of shaft 52 to detect a rotational position of shaft 52, thereby constantly detecting the absolute positions of carriages 49. More specifically, absolute encoder 57 detects the position of carriages 49 as a coordinate position in the moving coordinate system of the carriages.

A shaft 60 is fixed to the center of arm base 58 and horizontally extends therefrom, as shown in FIGS. 1 and 10A to 11B. A double carrier frame 59 is rotatably mounted on shaft 60 by means of a bearing 61. Frame 59 comprises first and second holding frames 71 and 72 integrally formed with each other. A pulse motor 107 having a rotating shaft 107a is mounted on arm base 58. A pulley 108 is mounted on the rotating shaft 107a. A shaft 111 is rotatably mounted on arm base 58. A first mid-pulley 109 is mounted on one end of the shaft 111, and a second mid-pulley 112 is mounted on the other end of the shaft 111. A belt 110 is looped between pulley 108 and first mid-pulley 109. A pulley 113 is mounted on the shaft 60. A belt 114 is looped between second mid-pulley 112 and pulley 113. The driving force of pulse motor 107 is transmitted to double carrier frame 59 through pulley 108, belt 110, first mid-pulley 109, second mid-pulley 112, belt 114, and pulley 113. When pulse motor 107 is rotated in the forward/reverse direction, double carrier frame 59 is rotated through 180 degrees in the forward/reverse direction and is stopped horizontally.

Figure 10A:
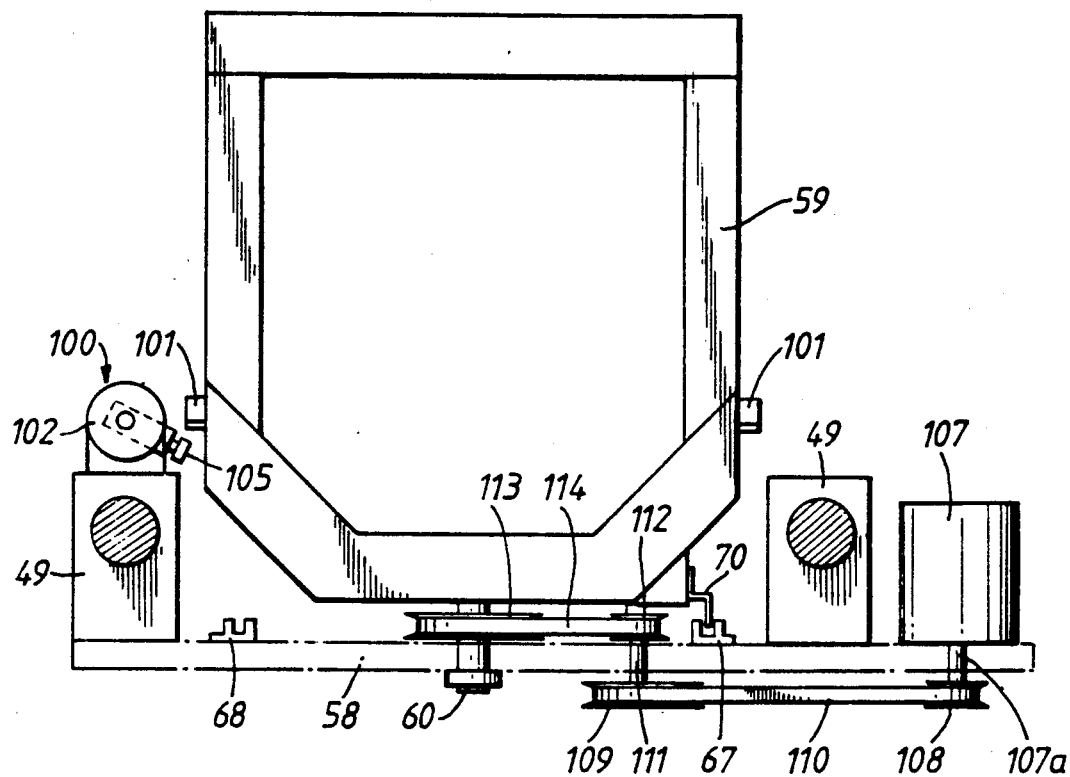
FIGS. 10A and 10B are respectively a schematic plan view and a front view showing a carrier frame and a positioning mechanism.
Figure 10B:
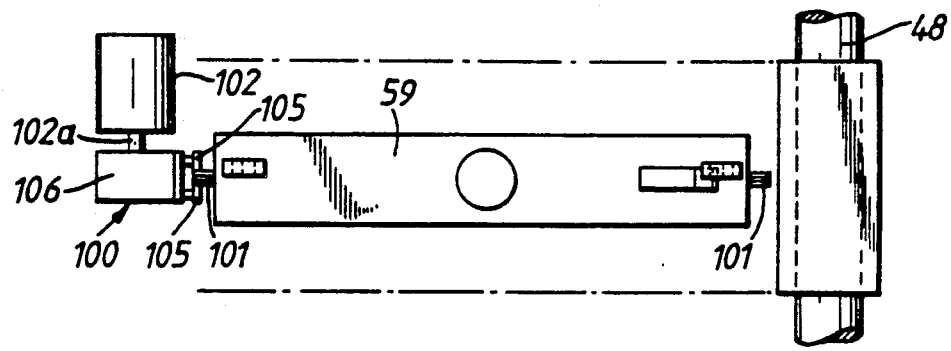
Figure 11C:
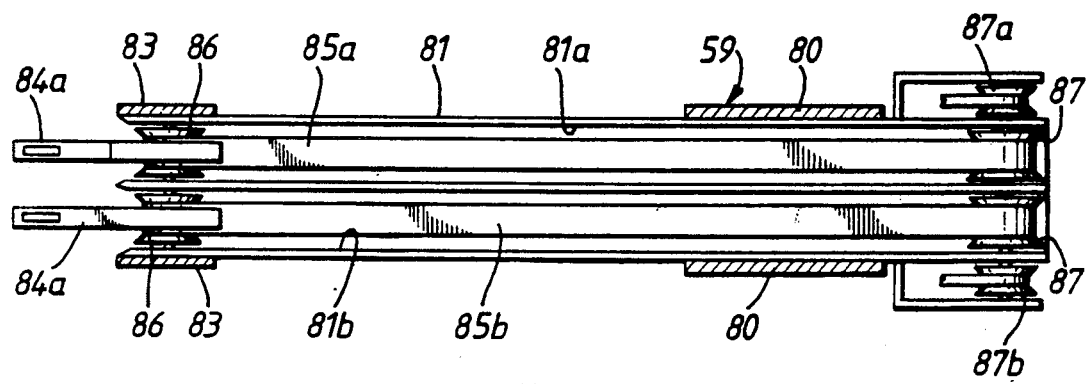
FIG. 11C is a sectional view of the carrier frame taken along the line XIC—XIC in FIG. 11A.

As shown in FIGS. 10A and 10B, a frame stopper 100 is mounted as a positioning means for double carrier frame 59 on one of carriages 49. A fifth detector 67 and a sixth detector 68 are mounted on arm base 58 in symmetrical positions with respect to shaft 60. A light-shielding plate 70 is mounted on frame 59 and is spaced apart from shaft 60 opposite to arm base 58. When frame 59 is rotated from the horizontal position, plate 70 is detected by fifth detector 67 or sixth detector 68. A pair of catching blades 101 that are on opposite sides of carrier frame 59, are mounted on carrier frame 59 in symmetrical positions with respect to shaft 60.

Figure 19:
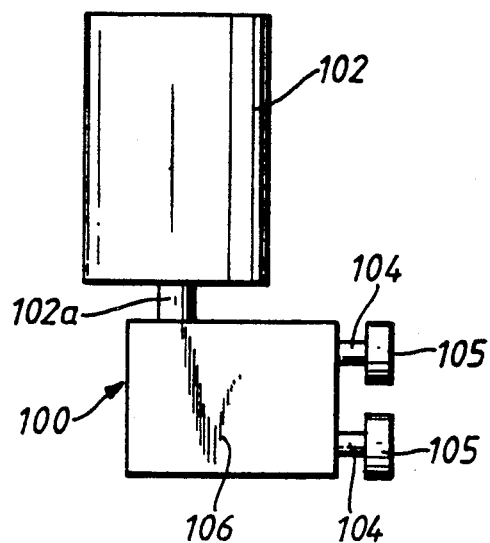
Figure 20A:
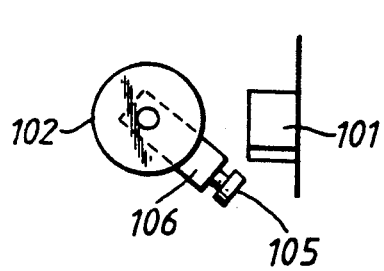
FIGS. 20A and 20B are plan views for explaining the operation of the positioning mechanism of FIG. 19.
Figure 20B:
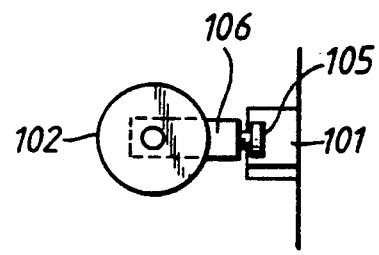

Frame stopper 100 comprises a rotary solenoid 102 having a rotating shaft 102a, and a supporting member 106 mounted on rotating shaft 102a, as shown in FIG. 19. Supporting member 106 can be rotated through a prescribed angle by the actuation of rotary solenoid 102, as shown in FIGS. 20A and 20B. A pair of shafts 104 is mounted on supporting member 106, and rotatable holding rollers 105 are respectively mounted on shafts 104 as holding members.

Figure 21A:
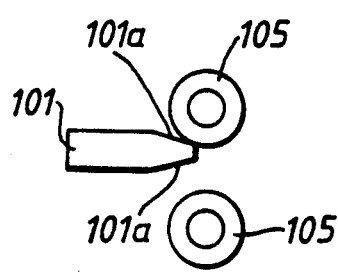
Figure 21B:
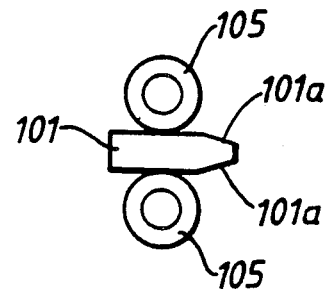

As shown in FIGS. 21A and 21B, the thickness of catching blades 101 mounted on carrier frame 59 is substantially equal to the gap between holding rollers 105 and 105. Therefore, catching blade 101 is engaged between holding rollers 105 without any clearance when supporting member 106 is rotated by rotary solenoid 102.

The side edge of catching blade 101 that first comes into engagement with holding rollers 105 defines tapered surfaces 101a to form a sharpened portion. Therefore, a correct engagement between catching blade 101 and holding rollers 105 is obtained even if carrier frame 59 is not precisely horizontal and is offset slightly (up to about 5 mm) with respect to supporting member 106.

An inverting operation of disk cassette 10 held in carrier frame 59 will be described. Carrier frame 59 is initially positioned and fixed in a horizontal disposition by frame stopper 100. First, rotary solenoid 102 actuates to rotate supporting member 106. As a result, catching blade 101 of carrier frame 59 is released from holding rollers 105. Next, pulse motor 107 is energized to rotate carrier frame 59 through 180 degrees. Carrier frame 59 is now in an inverted state. However, there may be occasions when it fails to come accurately to a horizontal disposition because of variation in the stopping position of rotating shaft 107a of pulse motor 107 or loosening of belts 110 and 114. Then, since the stopping position of carrier frame 59 is maintained by pulse motor 107, the stopping position of carrier frame 59 may be dislocated from the correct position by vibration or other external force.

When carrier frame 59 is inverted and brought to the state described above, light-shielding plate 70 cooperates with fifth detector 67 or sixth detector 68 to detect that carrier frame 59 is in a nearly horizontal disposition. On detection of this state, rotary solenoid 102 is energized to rotate supporting member 106. As a result, catching blade 101 mounted on carrier frame 59 is engaged with holding roller 105 of supporting member 106. Therefore, carrier frame 59 is forcibly positioned to a corrected horizontal position even if carrier frame 59 has slightly dislocated from a horizontal stopping position during rotation. Thus carrier frame 59 can be accurately aligned with guides 17 and 19 of storage section 13, with a disk inlet port 79 of disk drive unit 3, or with loading device 12. In other words, transferring of disk cassette 10 among carrier frame 59, storage section 13, disk drive units 3, and loading device 12 in a stable state is possible even if there is vibration imposed from the exterior or by the apparatus itself.

In the position where light-shielding plate 70 is detected by fifth detector 67, a first cassette holding frame 71 in double carrier frame 59 faces upward. In the position where light-shielding plate 70 is detected by sixth detector 68, a second cassette holding frame 72 faces upward.

Figure 12:
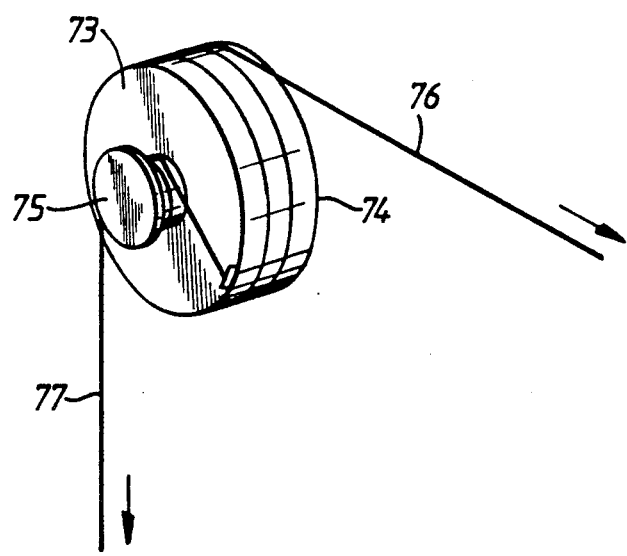
Figure 13:
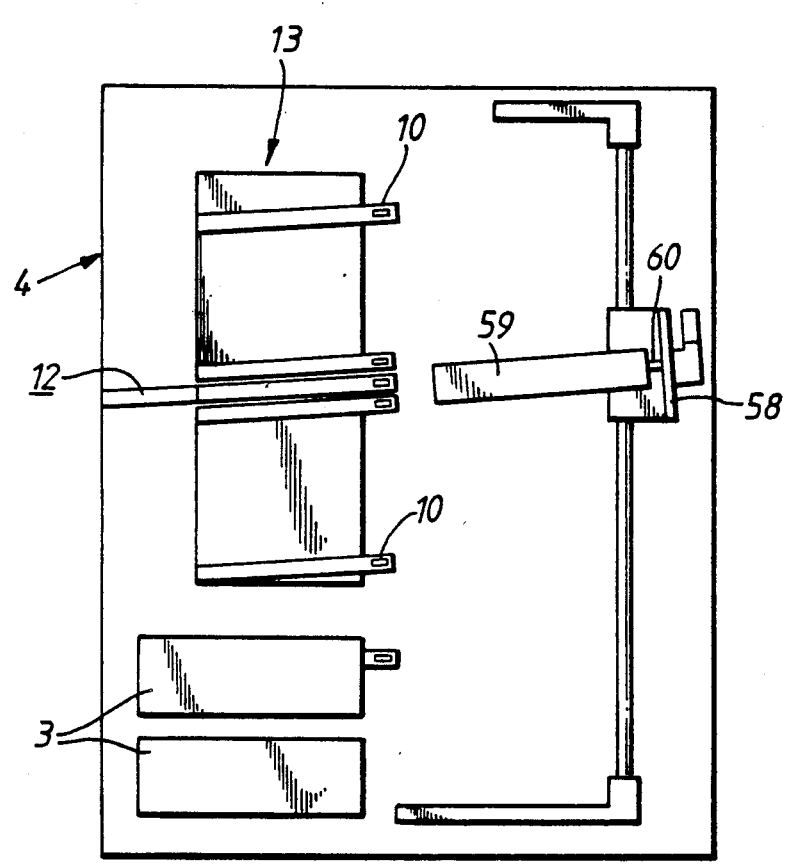

As shown in FIGS. 1 and 12, a pair of wheels 73 are rotatably mounted on upper frame 47 through a support arm (not shown). Each wheel 73 comprises large- and small-diameter rollers 74 and 75 which are concentric and formed integrally. One end of each of two wires 76 and 77 is fixed to a corresponding one of wheels 73. An intermidiate portion of wire 76 is wound around large-diameter roller 74 and a fixed roller (not shown). The other end of wire 76 is fixed to corresponding carriage 49. The intermidiate portion of wire 77 is wound around small-diameter roller 75, and the other end of wire 77 is connected to one end of a spring 78. The other end of spring 78 is connected to the bottom of lower frame 47. The weight of carriage 49 is balanced with the tension force of spring 78. Disk cassettes 10 are stored in storage section 13 in an inclined manner. As shown in FIG. 13, shaft 60 as the rotational center of carrier frame 59 and carrier frame 59 are also inclined at the same angle as that of disk cassette 10. By this inclination, disk cassette 10 can be inserted into or removed from disk inlet port 79 of each optical disk drive unit 3.

As shown in FIGS. 10A to 11C, double carrier frame 59 comprises a rear frame member 80, a pair of parallel side frame members 81 and 82, and front frame member 83 and has a substantially rectangular shape. Carrier frame 59 is supported while rear frame member 80 is mounted on shaft 60. A pair of parallel guide grooves 81a and 81b are formed in the inner surface of side frame member 81 throughout the entire length thereof. A pair of guide rollers 86 are coaxially and rotatably mounted on the front end of side frame member 81 and are located in the front end portions of guide grooves 81a and 81b. A pair of guide rollers 87 are coaxially and rotatably mounted on the rear end of side frame member 81, and are located in the rear end portions of guide grooves 81a and 81b. A belt 85a is looped between rollers 86 and 87 located inside guide groove 81a. Similarly, a belt 85b is looped between rollers 86 and 87 located inside guide groove 81b. Belts 85a and 85b run endlessly along guide grooves 81a and 81b, respectively. In the same manner as in side frame member 81, a pair of parallel guide grooves 82a and 82b are formed in side frame member 82. Guide rollers 86 and 87 are located at the front and rear ends of each of guide grooves 82a and 82b. Belts 85a and 85b are looped between guide rollers 86 and 87 and designed to run along the guide grooves. Each of guide grooves 81a, 81b, 82a, and 82b has a width slightly larger than the thickness of disk cassette 10, so that the side edge of portions of the disk cassette can be inserted in the guide grooves. More specifically, guide grooves 81a and 82a constitute first holding frame 71 for holding disk cassette 10. Guide grooves 81b and 82b constitute second holding frame 72. The distance between guide grooves 81a and 81b and between guide grooves 82a and 82b is the same as the pitch of guides 17 (or 19) in storage section 13. As shown in FIGS. 14A and 14B, disk cassette 10 is transferred with being completely held in the holding frames. First and second holding frames 71 and 72 are arranged to be symmetrical about shaft 60 as the center of rotation. When carrier frame 59 is rotated through 180 degree, the positions of holding frames 71 and 72 are reversed.

Belt 85a is driven by a stepping motor 88 arranged on rear frame member 80. A driving force of motor 88 is transmitted to belt 85a on the side of side frame member 82 through a pulley 89 mounted on the rotating shaft of motor 88, a belt 90, a pulley 87a concentric with roller 87, and roller 87. The driving force is transmitted to belt 85a on the side of side frame member 81 through pulley 89, a belt 91, a pair of pulleys 92, a belt 93, pulley 87a, and roller 87. Belts 85b are driven independently of belts 85a by a drive mechanism having the same structure described above.

Sliding pawls 84a and 84b are fixed to belts 85a and 85b, respectively, and run together with the corresponding belts along guide grooves 81a and 81b (82a and 82b). Each pawl is designed to engage with a recess 94 (FIG. 15) formed at an end portion of each side surface of disk cassette 10. Belts 85a (or 85b) are driven while pawls 84a (or 84b) are respectively engaged with recesses 94, and then the disk cassette can be inserted in the holding frames along the guide grooves or removed therefrom.

Figure 16A:
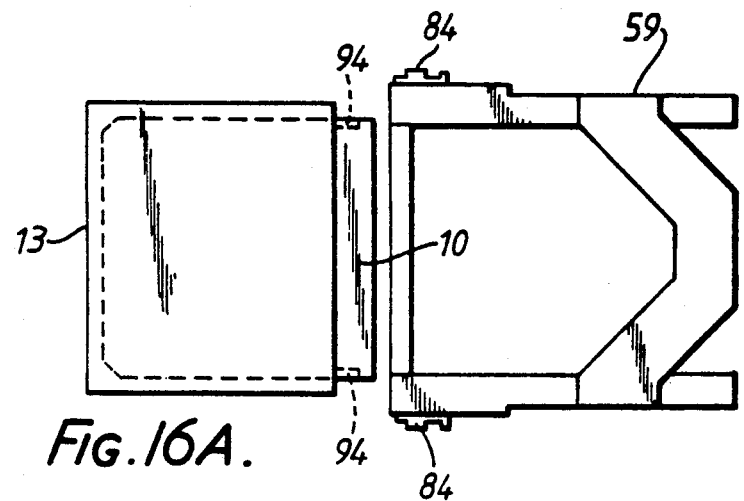
FIGS. 16A to 16C are schematic plan views showing processes of carrying the disk cassette from the storage section in the transfer frame.
Figure 16B:
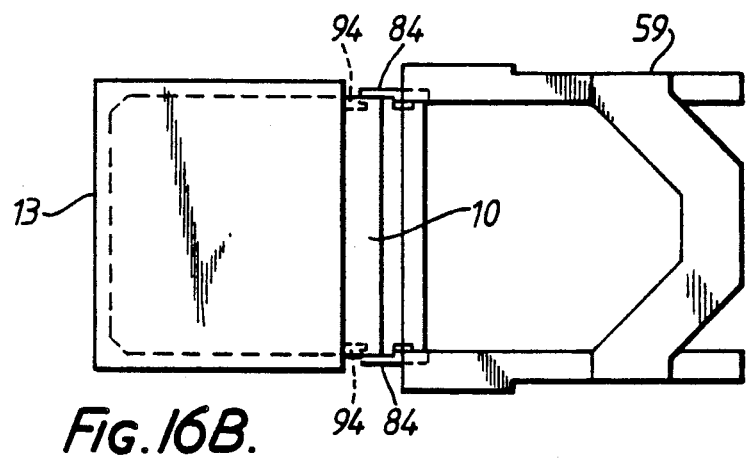
Figure 16C:
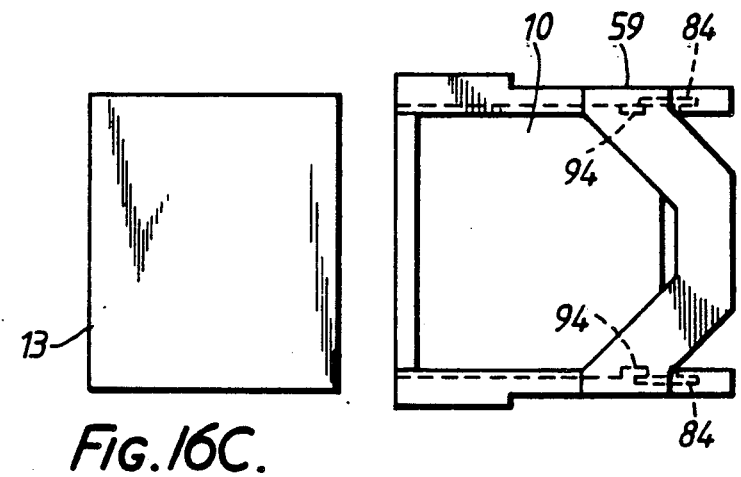

When desired disk cassette 10 is to be carried in carrier frame 59 from storage section 13, carrier frame 59 is moved to a position where one of the holding frames thereof opposes the desired disk cassette, as shown in FIG. 16A. In this state, sliding pawls 84 are out of the guide grooves of the holding frames. Subsequently, as shown in FIG. 16B, pawls 84 are driven and engaged with recesses 94 of disk cassette 10, respectively. When pawls 84 are further driven, disk cassette 10 is received by the holding frame, as shown in FIG. 16C.

In order to transfer disk cassette 10 from carrier frame 59 into storage section 13 or from carrier frame 59 into disk drive unit 3, the operation procedure are reversed.

As shown in FIG. 13, disk cassette 10 ejected from optical disk drive unit 3 is located in the same state as that of other disk cassettes 10 stored in storage section 13. For this reason, disk cassette 10 can be carried from disk drive unit 3 in carrier frame 59 with the same manner as in the case wherein disk cassette 10 is carried from the storage section in the carrier frame. In addition, the ejection procedures are identical in the above operations.

Figure 17A:
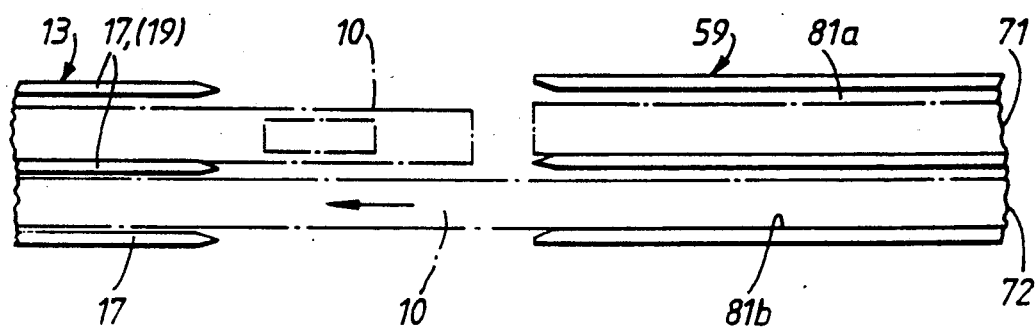
FIGS. 17A and 17B are schematic views showing the positional relationships between the transfer frame and the storage section when disk cassette loading and disk cassette ejection are respectively performed.
Figure 17B:
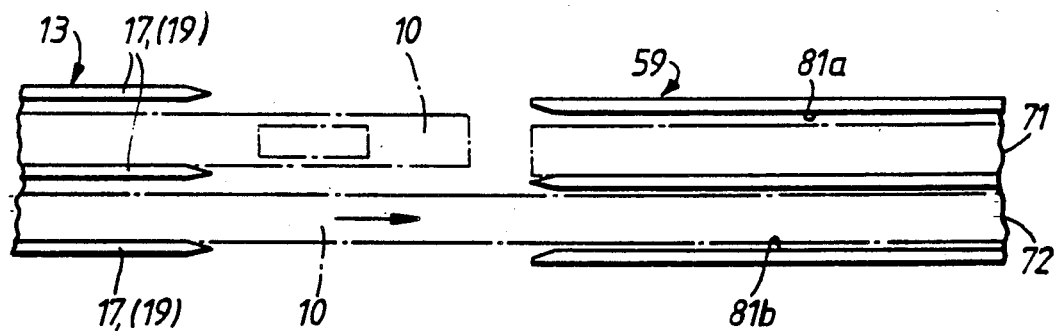

As shown in FIG. 17, the width of each guide groove of frame 59 is larger than the thickness of disk cassette 10, so that the disk cassette can be easily inserted in frame 59. Similarly, the pitch of guides 17 and 19 in storage section 13 is larger than the thickness of disk cassette 10. Therefore, the disk cassette can be easily received by the storage section. When disk cassette 10 is to be inserted into storage section 13 from frame 59, frame 59 is positioned such that the disk cassette is located at the middle portion between adjacent guides 17 (19) in the storage section, as shown in FIG. 17A. While, when disk cassette 10 is to be taken into frame 59 from storage section 13, frame 59 is positioned such that the disk cassette is located at the middle portion of first cassette holding frame 71 or second cassette holding frame 72, as shown in FIG. 17B.

When disk cassette 10 is to be inserted in or removed from disk drive unit 3, carrier frame 59 is positioned in the same manner as described above.

In transfer device 14 having the structure described above, disk cassette 10 carried in storage section 13 by loading device 12 is loaded once in optical disk drive unit 3. Drive unit 3 reads information from optical disk 9 and discriminates side A or B of disk 9. On the basis of such discrimination information, disk cassette 10 is stored in an empty space in storage section 13 in the same orientation as that of other disk cassettes. Transfer device 14 performs the following operations: a loading operation for transferring designated disk cassette 10 from storage section 13 to designated optical disk drive unit 3 and loading it therein; an ejecting operation for transferring disk cassette 10 ejected from designated disk drive unit 3 to storage section 13 and storing it where it was; a disk cassette changing operation as combination of loading and ejecting operations; a reversing operation for taking out disk cassette 10 from designated disk drive unit 3, reversing the side from side A to side B or side B to side A, and loading the reversed disk cassette into disk drive unit 3 again; and a returning operation for taking out designated disk cassette 10 from storage section 13, and conveying it to loading device 12, and causing loading device 12 to carry out it from input/output port 11.

Figure 18A:
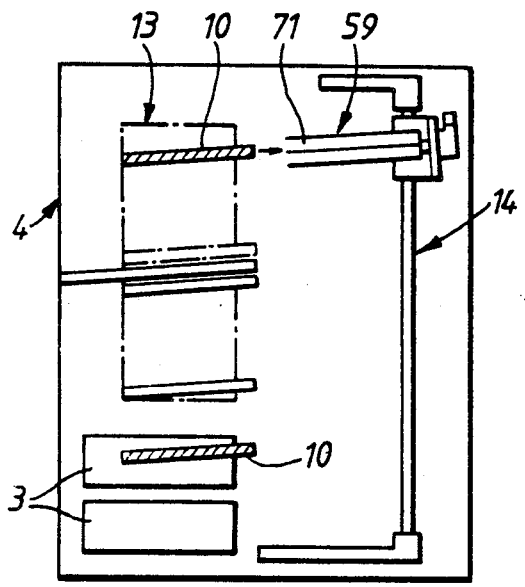
FIGS. 18A to 18E are schematic views showing an operation for changing the disk cassettes.
Figure 18B:
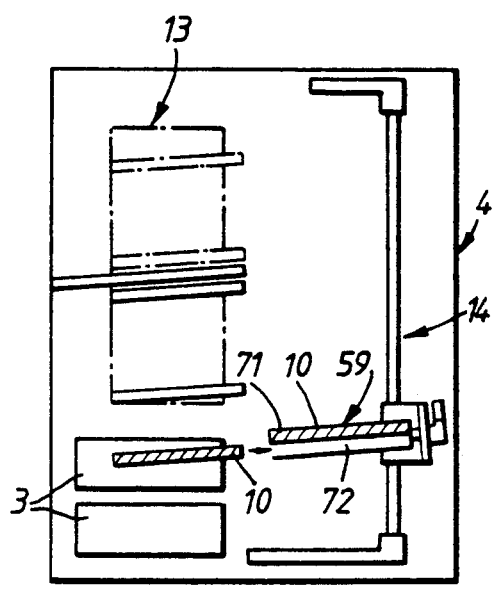
Figure 18C:
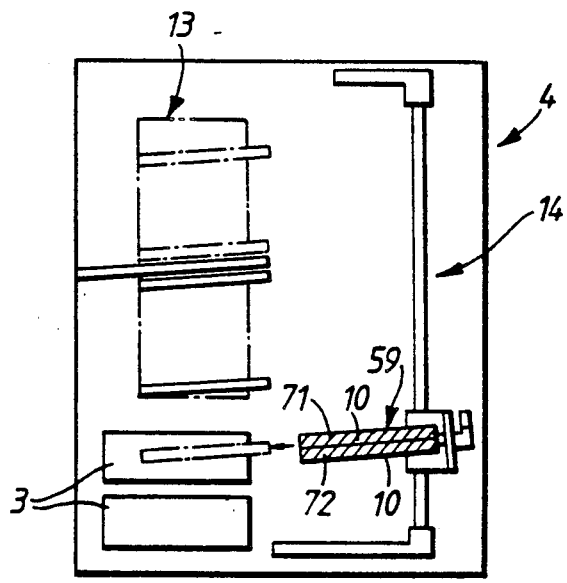
Figure 18D:
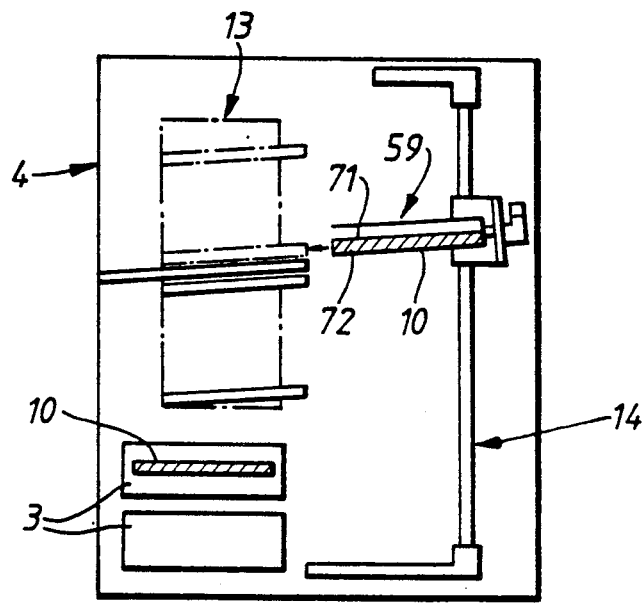
Figure 18E:
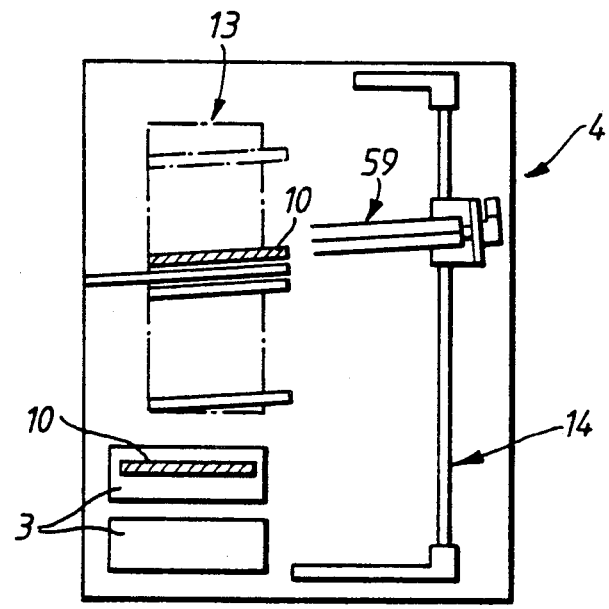

The overall of automatic disk changing apparatus 4 will be described with reference to FIGS. 18A to 18E, wherein the disk changing operation is exemplified. First, an operator inputs a processing instruction, that is, a signal indicative of the specific disk cassette 10 to be loaded into disk drive unit 3, on a main controller (not shown). The controller delivers a signal, which is indicative of a target-coordingate position to which carrier frame 59 is to be moved, that is, the coordinate position of the designated disk cassette. At this time, the current-coordinate position of carrier frame 59 detected by encoder 57 is stored in the controller. In the controller, the current-coordinate position is subtracted from the target-coordinate position. In accordance with the calculation result, the controller delivers control data for controlling speed and direction of servo motor 53. If the difference between the current and target-coordinate positions is relatively great, the controller delivers control data for moving carrier frame 59 at constant speed. As carrier frame 59 approaches the target-coordinate position, thus reducing the value of the subtraction result, the controller delivers control data for moving carrier frame 59 in a decelerating manner. As a result, the rotating speed of motor 53 and therefore, the moving speed of carrier frame 59, are lowered. When the control data is delivered to motor 53, carrier frame 59 is moved to a position where, for example, first holding frame 71 opposes designated disk cassette 10, as shown in FIG. 18A. Disk cassette 10 is taken into first holding frame 71. Subsequently, by repeating the aforementioned operation. carrier frame 59 is moved to a position where second holding frame 72 opposes designated optical disk drive unit 3, as shown in FIG. 18B. Meanwhile, disk cassette 10 is ejected from disk drive unit 3. Subsequently, disk cassette 10 ejected from disk drive unit 3 is taken into second holding frame 72. As shown in FIG. 18C, carrier frame 59 is moved to a position where disk cassette 10 in first holding frame 71 can be inserted in disk drive unit 3. Disk cassette 10 is then loaded in disk drive unit 3. Then, a control data is delivered from the controller to motor 53, and carrier frame 59 is moved to a position where second holding frame 72 opposes that portion in the storage section 13 wherein disk cassette 10 held by second holding frame 72 was stored, as shown in FIG. 18D. Disk cassette 10 held by second holding frame 72 is then returned to the position where it was in storage section 13. In the state shown in FIG. 18E, the disk changing operation is completed.

In the above description, the disk changing operation does not accompany rotation of carrier frame 59. However, when disk cassette 10 is to be inserted in the optical disk drive unit, carrier frame 59 may be rotated through 180 degrees to reverse the side of the disk cassette, and the reversed disk cassette may be inserted in disk drive unit 3. Various operation can be performed by combining the rotating operation and another operation of double carrier frame 59.

What is claimed is:

1. An apparatus for automatically changing an information storage medium, comprising:
    a main body;
    a storage section having a plurality of storage portions in the main body for storing a plurality of information storage media therein;
    at least one information processing unit having an inlet port in the main body for processing information stored in the medium inserted therein through the inlet port; and
    transfer means for transferring the medium between the storage section and the information processing unit and for automatically inserting the medium into the storage section and the information processing unit, the transfer means including a base member; frame means rotatably mounted on the base member for holding at least one information storage medium, wherein the frame means is rotatable about an axis in the horizontal plane and wherein the frame means includes a transporting means for transporting the information storage medium into the holding portion or removing the medium therefrom, and a pair of catching members each having a prescribed thickness symmetrically positioned thereon with respect to the shaft; drive means for rotating the frame means with respect to the base member, drive means including a shaft and means for rotating the rectangular frame member about the shaft through 180°; and positioning means for forcibly positioning the frame means in alignment with respect to one of the plurality of storage portions of the storage section or inlet port of the information processing unit after the rotation of the frame means by the drive means.

2. The apparatus of claim 1 wherein the positioning means includes means for holding each of the catching members, the holding means being movable between an engagement position wherein one of the catching members is engaged by the holding means and a disengagement position wherein the catching members are disengaged from the holding means.

3. The apparatus of claim 2 wherein the positioning means includes means for detecting the orientation of rectangular frame member in one of two predetermined orientations after the rotation thereof and actuating the holding means for moving the holding means from the disengagement position to the engagement position.

4. The apparatus of claim 3 wherein the holding means includes:
    a rotary solenoid;
    a supporting member operatively connected to the rotary solenoid for rotation therewith; and
    a pair of holding rollers, rotatably mounted on the supporting member with a gap therebetween, for movement between the engagement position and the disengagement position, the gap being substantially equal to the prescribed thickness of the catching member.

5. The apparatus of claim 4 wherein the catching members each has at least one tapered surface.

6. An apparatus for automatically changing an information storage medium, comprising:
    a main body having an input/output port;

a storage section having a plurality of storage portions in the main body for storing a plurality of information storage media therein;

loading means for loading and unloading the storage medium via the input/output port;

at least one information processing unit having an inlet port in the main body for processing information stored in the medium inserted therein through the inlet port; and transfer means for transferring the medium among the loading means, the stored section and the information processing unit and for automatically inserting the medium into the storage section, the information processing unit and the loading means, the transfer means including a base member; frame means rotatably mounted on the base member for holding at least one information storage medium, wherein said frame means is rotatable about an axis in the horizontal plane and wherein the frame means includes at least one rectangular frame member defining a holding portion for holding the information storage medium, means for transporting the information storage medium into the holding portion or removing the medium therefrom, and a pair of catching members each having a prescribed thickness symmetrically positioned thereon with respect to the shaft.; drive means for rotating the frame means with respect to the base member, the drive means including a shaft and means for rotating the rectangular frame member about the shaft through 180°; and positioning means for forcibly positioning the frame means in alignment with respect to one of the plurality of storage portions of the storage section, the inlet port of the information processing unit or the loading means after the rotation of the frame means by the drive means.

7. The apparatus of claim 6 wherein the positioning means includes means for holding each of the catching members, the holding means being movable between an engagement position wherein one of the catching members is engaged by the holding means and a disengagement position wherein the catching members are disengaged from the holding means.

8. The apparatus of claim 7 wherein the positioning means includes means for detecting the orientation of rectangular frame member in one of two predetermined orientations after the rotation thereof and actuating the holding means for moving the holding means from the disengagement position to the engagement position.

9. The apparatus of claim 8 wherein the holding means includes:
 a rotary solenoid;
 a supporting member operatively connected to the rotary solenoid for rotation therewith; and
 a pair of holding rollers, rotatably mounted on the supporting member with a gap therebetween, for movement between the engagement position and the disengagement position, the gap being substantially equal to the prescribed thickness of the catching member.

10. The apparatus of claim 9 wherein the catching members each has at least one tapered surface.

* * * * *

UNITED STATES PATENT AND TRADEMARK OFFICE
CERTIFICATE OF CORRECTION

PATENT NO. : 5,001,582
DATED : March 19, 1991
INVENTOR(S) : Takamoto Numasaki It is certified that error appears in the above-identified patent and that said Letters Patent is hereby corrected as shown below:

Claim 6, column 11, line 27, after "shaft" delete [.].

Signed and Sealed this

First Day of June, 1993

Attest:

MICHAEL K. KIRK

*Attesting Officer*   Acting Commissioner of Patents and Trademarks